United States Patent [19]

Kosaka et al.

[11] Patent Number: 5,630,955
[45] Date of Patent: May 20, 1997

[54] METHOD OF INDUCING ARC GENERATION IN ARC WELDING

[75] Inventors: Tetsuya Kosaka; Hiromitsu Takahashi, both of Yamanashi, Japan

[73] Assignee: Fanuc Ltd., Minamitsuru-gun, Japan

[21] Appl. No.: 527,634

[22] Filed: Sep. 13, 1995

[30] Foreign Application Priority Data

Sep. 21, 1994 [JP] Japan .................... 6-251550

[51] Int. Cl.$^6$ .................................................. B23K 9/06
[52] U.S. Cl. ........................... 219/130.4; 219/125.1; 901/42
[58] Field of Search ..................... 219/130.4, 124.01, 219/125.1; 901/42

[56] References Cited

U.S. PATENT DOCUMENTS

| | | | |
|---|---|---|---|
| 4,538,047 | 8/1985 | Nakano et al. | 219/125.1 |
| 4,618,760 | 10/1986 | Murch et al. | 219/130.4 |
| 4,647,753 | 3/1987 | Nakashima et al. | 219/125.1 |
| 4,772,776 | 9/1988 | Siina | 219/130.4 |
| 4,952,773 | 8/1990 | Orsos et al. | 219/124.01 |
| 5,170,034 | 12/1992 | Seshimo et al. | 219/125.1 |
| 5,486,679 | 1/1996 | Hamura et al. | 219/130.4 |

FOREIGN PATENT DOCUMENTS 57-175079  10/1982  Japan ................... 219/130.4

*Primary Examiner*—Clifford C. Shaw
*Attorney, Agent, or Firm*—Staas & Halsey

[57] ABSTRACT

A method of inducing arc generation in arc welding between a head of a wire and a workpiece, such that a robot supports a welding torch, thereby causing the head of the wire to be brought near a welding start position on a workpiece. However, if there is a failure to generate an arc between the head of the wire at the position and the workpiece within a predetermined time, at least one cycle is repeated of a sequential retrial motion, in which first the robot is made to move to cause the head of the wire to be moved at a predetermined speed from a position close to the present welding start position to another position away from the position by a predetermined distance, and then the robot is made to move in the opposite direction to cause the head of the wire to be moved at a predetermined speed toward the welding start position. Then, when an arc generation signal is detected during repeated performance of the retrial motion, the retrial motion is stopped, and a predetermined welding for the workpiece is started.

9 Claims, 7 Drawing Sheets

FIG. 1

(PRIOR ART)

FIG. 2

(PRIOR ART)

```
WELDING  A

1 : AXIS POSITION [1]              100%         POSITIONING
    2 : STRAIGHT LINE POSITION [2]     500mm/sec    POSITIONING
    3 : ARC START
    4 : STRAIGHT LINE POSITION [3]     100mm/sec    POSITIONING
    5 : ARC END
    6 : STRAIGHT LINE POSITION [4]     500mm/sec    POSITIONING
[END ]
```

FIG. 5

```
WELDING SETTING

1 : STROKE LENGTH   (mm)           2.0
    2 : NUMBER OF RETRIALS             3
    3 : RETRIAL SPEED   (mm/sec)       60
```

METHOD OF INDUCING ARC GENERATION IN ARC WELDING

BACKGROUND OF THE INVENTION

1. Field of the Invention

The present invention relates to a method of taking an action for positively inducing arc generation if an arc is not generated between a wire head and a workpiece to be welded where an arc welding torch is mounted on an industrial robot to attempt to perform arc welding for the workpiece to be welded.

2. Description of the Related Art

In executing an arc welding for a subject of welding (hereinafter referred to as a workpiece) using an industrial robot (hereinafter simply referred to as a robot) on which an arc welding torch is mounted, an arc discharge sometimes fails to be generated even when a welding torch and a workpiece are brought close to each other while a welding voltage is supplied.

If such a situation occurs, it is necessary to immediately take an action for inducing an arc generation, and then the robot is allowed to move along a welding line. Such an action taken for inducing an arc generation, hereinafter referred to as a retrial motion, will be explained in the following. As the retrial motion, the following two methods have been known:

(1) A method, in which the surface of the workpiece is scratched by the head of a welding wire if no arc is generated at a point when welding is started.

Figure 1:
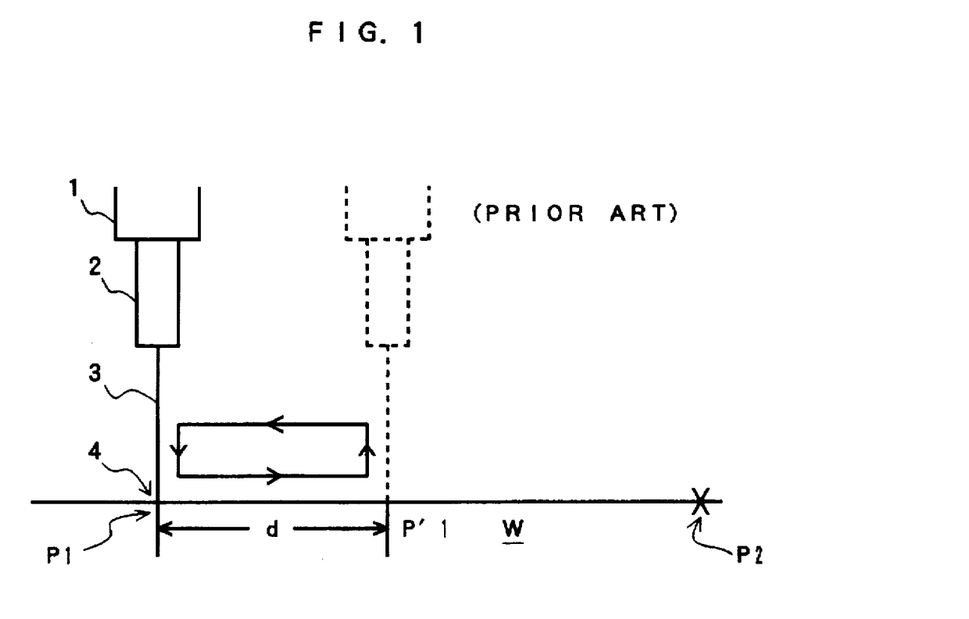
FIG. 1 is a view to explain one example of a conventional retrial motion.

In the retrial motion of this method, as shown in FIG. 1, a head 4 of a wire 3 is moved from a welding start point P1 to a point P'1 on a midway of welding route ranging from the welding start point P1 to the welding end point P2, while being pressed against the top surface of a workpiece W. The movement of the wire head 4 is performed by a robot (of which only an arm head 1 is shown in FIG. 1) supporting a welding torch 2. During the movement of the head 4 of the wire 3 from the point P1 to the point P'1, the slug and the like causing the failure of arc generation are removed. The head 4 of the wire 3 when reached the point P'1 leaves the workpiece W and is returned to the welding start point P1. If an arc still fails to generate even after one retrial motion, the same motion will be repeated until an arc is generated. Then, when an arc is generated at last, the head 4 of the wire 3 is returned once to the welding start point P1 to start arc welding.

(2) A method, in which the wire 3 is repeatedly moved back and forth with respect to the workpiece W by sending out the welding wire 3 from the welding torch 2 and withdrawing it thereinto using a wire feeder.

Figure 2:
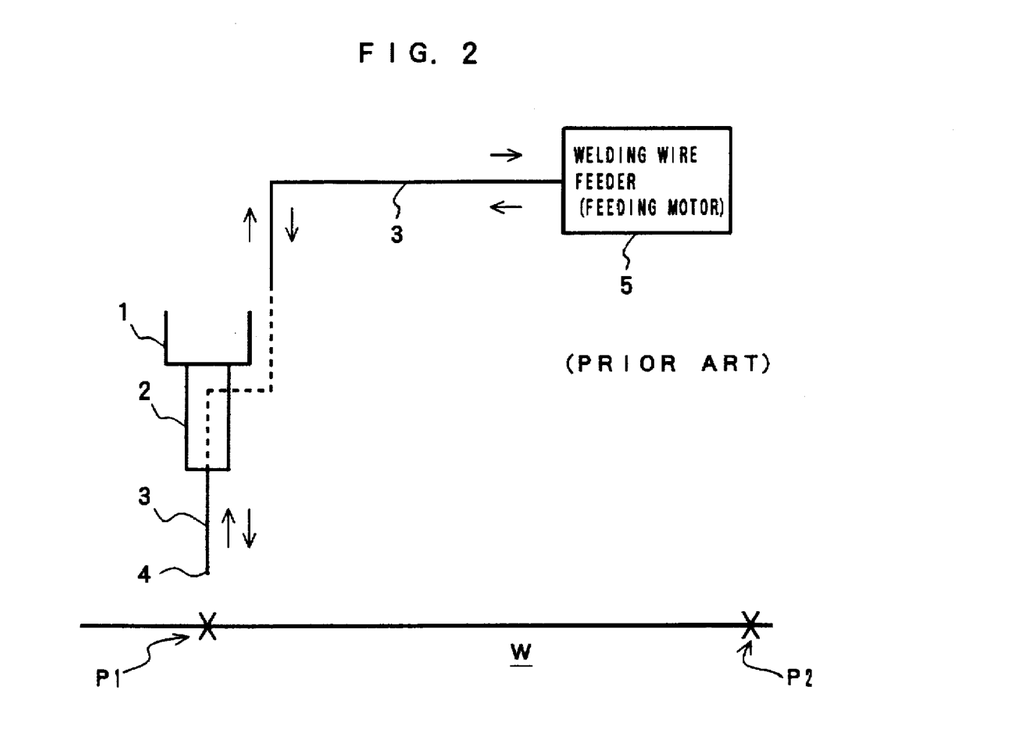
FIG. 2 is a view to explain another example of a conventional retrial motion.

In the retrial motion by this method, as shown in FIG. 2, the robot supporting the welding torch is at rest, so that the welding wire 3 alone is sent out from the welding torch 2 to cause its head 4 to approach or contact the welding start point P1, or withdrawn into in the welding torch 2 to cause its head 4 to leave the welding start point P1.

When an arc is generated between the wire head 4 and the workpiece W by the trial motion in the above-mentioned method (1) or (2), the length of welding wire 3 to be sent out of the welding torch 2 is adjusted, aria the robot is allowed to move from the welding start point P1 to the welding end point P2 (hereinafter, the movement of the robot means the movement of a tool center point corresponding to the position of the head 4 of the welding wire 3 which has been sent out by a predetermined amount from the welding torch 2 supported on the arm head 1 of the robot), thereby performing welding in the span from the point P1 to the point P2 on the workpiece.

However, in the above-mentioned method (1), the wire 3 is continuously fed even while the robot is moving, so that a situation is apt to be brought about in which the wire head 4 is hardly moved despite the fact that the robot is moving. If such a phenomenon occurs in which the movement of the wire head 4 is retarded, the motion of the wire head for scratching the surface of workpiece is not performed effectively, so that the effect of the action for inducing arc generation becomes weak as a result.

Also, in the above-mentioned method (2), a sagging of the wire 3 is apt to occur when the welding wire is sent out from or withdrawn into the wire feeder 6, and so there is a problem that it is difficult to control the wire feeder 5 so that the wire head 4 is made to optimally approach and leave the surface of the workpiece. That is, this method has a disadvantage in that, in this method, the performance of the retrial function depends on the performance of an external apparatus, so that the inherent ability of the welding system is unable to be fully utilized.

OBJECTS AND SUMMARY OF THE INVENTION

An object of the present invention is to make more efficient the arc generation by retrial motion, by allowing the robot supporting the welding torch to perform by itself the retrial motion rather than performing the retrial motion using an external apparatus such as a welding wire feeder.

According to the present invention, conditions required when the robot is allowed to perform the retrial motion are set prior to the welding work. These conditions include a robot moving distance, a robot moving speed and the like for specifying a repeated motion consisting of a motion toward a workpiece and a motion leaving the workpiece. Also, to set these conditions, a screen for inputting data included in the controller of the robot may be used.

BRIEF DESCRIPTION OF THE DRAWINGS

The foregoing and other objects and features of the invention will become apparent from the following description of preferred embodiments of the invention with respect to the accompanying drawings, in which:

FIG. 7 is a flowchart representing an outline of the processing of a main loop in this embodiment.

DETAILED DESCRIPTION OF THE PREFERRED EMBODIMENTS

Figure 3:
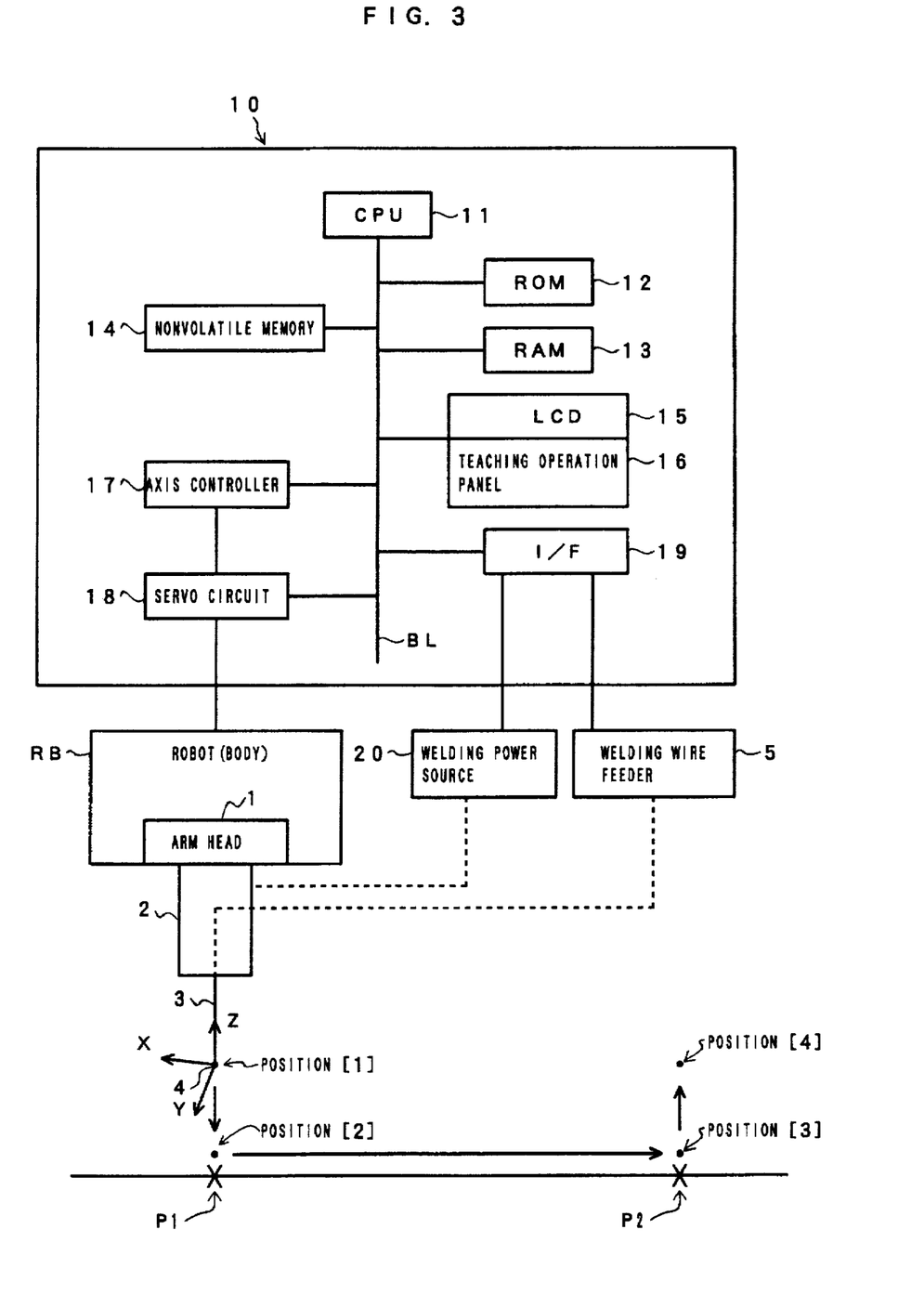
FIG. 3 shows a block diagram of a robot and a robot controller utilized to perform a method of the present invention, as well as a taught route of the robot in this embodiment.

FIG. 3 is a block diagram illustrating a principal part of the configuration of an entire welding robot system utilized when the present invention is performed, and the taught route of the robot in this embodiment, together with peripheral parts of a welding torch.

In the figure, reference code 10 designates a robot controller, which is provided with a central processing unit (hereinafter referred to as a CPU) 11 including a microprocessor. The CPU 11 is connected through a bus line BL with a memory 12 composed of a ROM, a memory 13 composed of a RAM, a nonvolatile memory 14, a teaching operation panel 16 including a liquid crystal display (LCD) 15, a robot axis control part 17 connected through a servo circuit 18 to a robot body RB, and a general-purpose interface (I/F) 19 connected to a welding wire feeder 5 and a welding power source 20.

The arm head 1 of the robot body RB is mounted with the welding torch 2. The welding torch 2 is fed with the welding wire 3 from the welding wire feeder 5 and supplied with a welding voltage/current from the welding power source 20. The welding wire feeder 5 and the welding power source 20, which have a well known structure and function, receive instructions respectively from the robot controller 10 to operate. The welding wire 3 is fed out by a feeding motor (not shown) built in the welding wire feeder 5.

Also, the welding power source 20 has a function for receiving an arc start instruction from the robot controller 10 to supply the welding voltage/current to the welding torch 2, as well as a function for detecting by an inner detection circuit that an arc is actually generated to inform the robot controller 10 of the generation of the arc. Such function of the welding power source 20 is well known, so that a detailed description thereof will be omitted. Now, reference numeral 4 designates a wire head; and reference codes P1 and P2 designate a welding start point and a welding end point, respectively.

The ROM 12 is stored with various programs used for the CPU 11 to control the robot body 1, the welding wire feeder 5, the welding power source 20 and the robot controller 10 itself. The RAM 13 is a memory utilized for temporary storage and calculation of data. The nonvolatile memory 14 is inputted/stored with set values of various parameters, and operation programs of the welding robot system.

Figure 4:
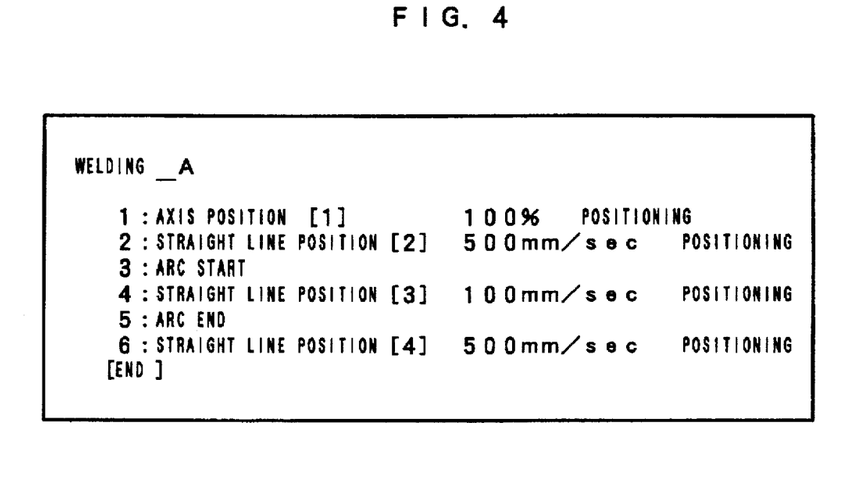
FIG. 4 is a view illustrating the contents of a program prepared in this embodiment.

Assume here that as an operation program, the one shown in FIG. 4 has been already prepared, and stored in the nonvolatile memory 14 together with position data. Position [1] through position [4] shown in FIG. 3 correspond to taught positions [1] through [4] in this operation program. Therefore, other than the retrial motion which will be next explained, the moving route of the robot follows a sequence, position [1]→position [2]→position [3]→position [4].

Further, a tool coordinate system, with the origin (tool center point) representing the distal end 4 of the welding wire, is set according to the directions of the coordinate axes shown in FIG. 3. That is, the Z axis of the tool coordinate system corresponds to the direction in which the welding wire 3 is sent out from the welding torch 2; the direction of the X axis is parallel to the direction from the welding start point P1 to the welding end point P2; and the direction of the Y axis is a direction perpendicular to the Y axis and the Z axis (a direction perpendicular to the paper in the case of FIG. 3).

Figure 5:
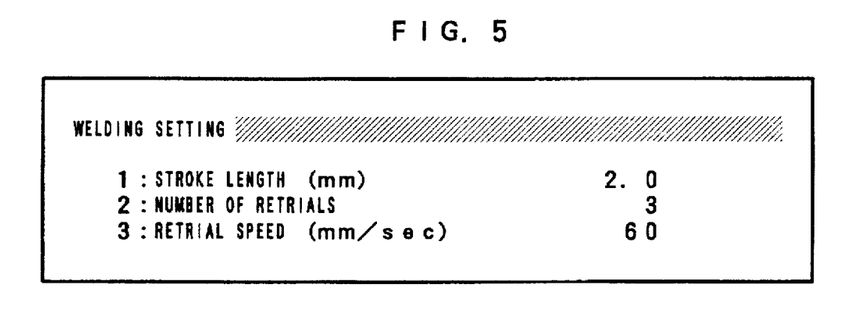
FIG. 5 is a view representing a retrial condition setting screen in this embodiment.

The above-mentioned matter in this embodiment is basically the same as those of a conventional welding robot system with respect to the configuration, function or coordinate system setting conditions, etc. However, in this embodiment, the following preparations are additionally made to perform the method of the present invention:

(1) The ROM 12 or the nonvolatile memory 14 has been stored with programs and related set values for allowing the retrial condition setting screen as shown in FIG. 5 to be displayed on the screen of the LCD 15 attached to the teaching operation panel 16, and allowing the retrial conditions inputted through the screen to be stored in the nonvolatile memory 14.

(2) A program for allowing the retrial motion to be performed according to the set retrial conditions (refer to flowchart shown in FIGS. 7 through 10) together with related set values are stored in the nonvolatile memory 14. The related set values include various flag values (initial values) given in the flowchart shown in FIGS. 7 through 10.

Under the above-mentioned preconditions, the execution procedure and processing contents of the welding work expecting the retrial motion to be performed when an arc is not generated will be sequentially explained hereinafter.

First, the teaching operation panel 16 is operated to allow the retrial condition setting screen shown in FIG. 5 to be displayed on the screen of the LCD 15 attached to the teaching operation panel 16. Here, the condition setting operation for making the robot perform a reciprocating motion as shown in FIG. 6 is carried out on the screen shown in FIG. 5, as an example of a robot motion to be made at the time of retrial motion.

Figure 6:
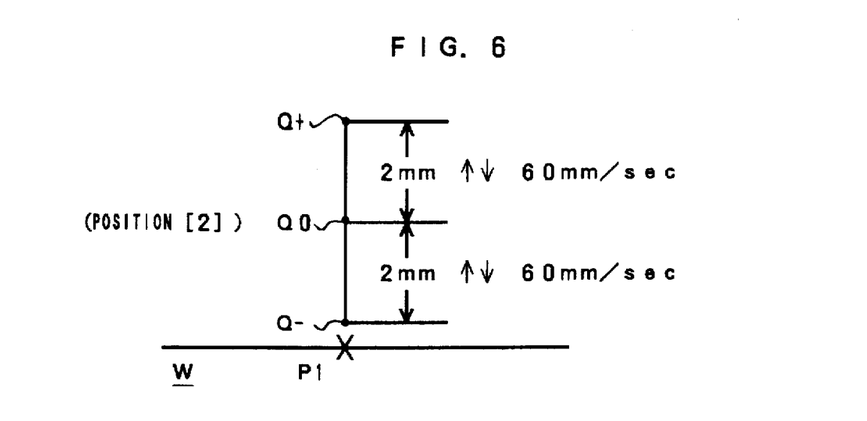
FIG. 6 is a view to explain the contents of a motion of the robot during retrial motion.

As shown in FIG. 6, a start point Q0 of the retrial motion of the robot corresponds to a point taught by the position [2] in the motion program shown in FIG. 4. The position [2] is a point taught as a position just above and near the welding start point P1 of the workpiece W. After the retrial motion is started, the robot moving route during the retrial motion is determined as follows:

First, the robot moves from the retrial start point Q0 toward a proximity point Q− close to (coincident with depending on the situation) the welding start point P1 (approaching movement), makes U-turn at the proximity point Q−, moves through the retrial start point Q0 to a remote point Q+ (separating movement). Then, the robot moves from the remote point Q+, passes through the retrial start point Q0, and moves again toward the proximity point Q−. Thereafter, making U-turn at the proximity point Q−, the robot repeats the similar movement a maximum of three times.

That is, if the retrial motion continues to the end without generating an arc during retrial motion, the robot movement route follows a sequence, (Q0→Q−→Q+)→(Q+→Q−→Q+)→(Q+→Q−→Q+). Here, assume that the travel in parentheses is counted as one stroke. Also, the length between Q0 and Q− that is equal to the length between Q0 and Q+ is called a stroke length, and its numeral value is set to 2 mm. Further, the moving speed (instructed value) of the robot for reciprocating motion is set to 60 mm/sec.

FIG. 5, shows a screen displaying data inputted which determine the retrial conditions. In the screen shown in FIG. 5, "Stroke length (mm)" on the first line represents the moving range from the retrial start point in mm unit in the robot retrial motion, and 2 mm is inputted through the screen according to the above-mentioned retrial conditions required to be set.

Similarly, "Number of retrial cycles" on the second line represents a limited number of cycles of the reciprocating motion in the robot retrial motion, which is set to three cycles. Further, "Retrial speed (mm/sec)" on the third line represents an instructed value of the speed of the reciprocating motion in the robot retrial motion, which is set to 60 mm/sec.

Under the retrial conditions set in the screen in FIG. 5, the outline of the motion where the motion program shown in FIG. 4 is regeneratively operated is listed as below:

1. The robot moves from the position [1] to the position [2] as the movement along each axis.

2. After the robot reaches the position [2] (=Q0), the robot controller 10 outputs an arc generation instruction to the welding power source 20, and waits for the input of an arc detection signal from the welding power source 20.

3. Where the arc detection signal is not inputted to the robot controller 10 within a specified wait time, the retrial motion is started. However, where the arc detection signal is inputted to the robot controller 10 within a specified wait time, the welding from P1 to P2 is performed while moving the robot to the position [3] as usual, and then, the robot is allowed to be shunted to the position [4] to end one work cycle.

4. After the retrial motion is started, the robot movement is allowed to continue so that the tool center point follows the above-mentioned route during retrial motion, Q0→Q−→Q+→Q−→Q+. . . This motion is continued until the above-mentioned set number of retrial cycles (three cycles here) is gone through. However, if the arc detection signal is inputted to the robot controller 10 during retrial motion, the retrial motion is immediately stopped, and a movement of the robot toward the position [3] is started. In the course of the movement toward the position [3], the welding from P1 to P2 is performed. Then, the robot is shunted to the position [4] to end one work cycle.

5. Where the arc detection signal is not inputted to the robot controller 10 before the above-mentioned set number of retrial cycles (three cycles here) is gone through, welding start is given up to generate an alarm signal timely, so that the operator is notified of that through the screen of the LCD 15, and an alarm buzzer (not shown in FIG. 3) and the like is provided.

Figure 8:
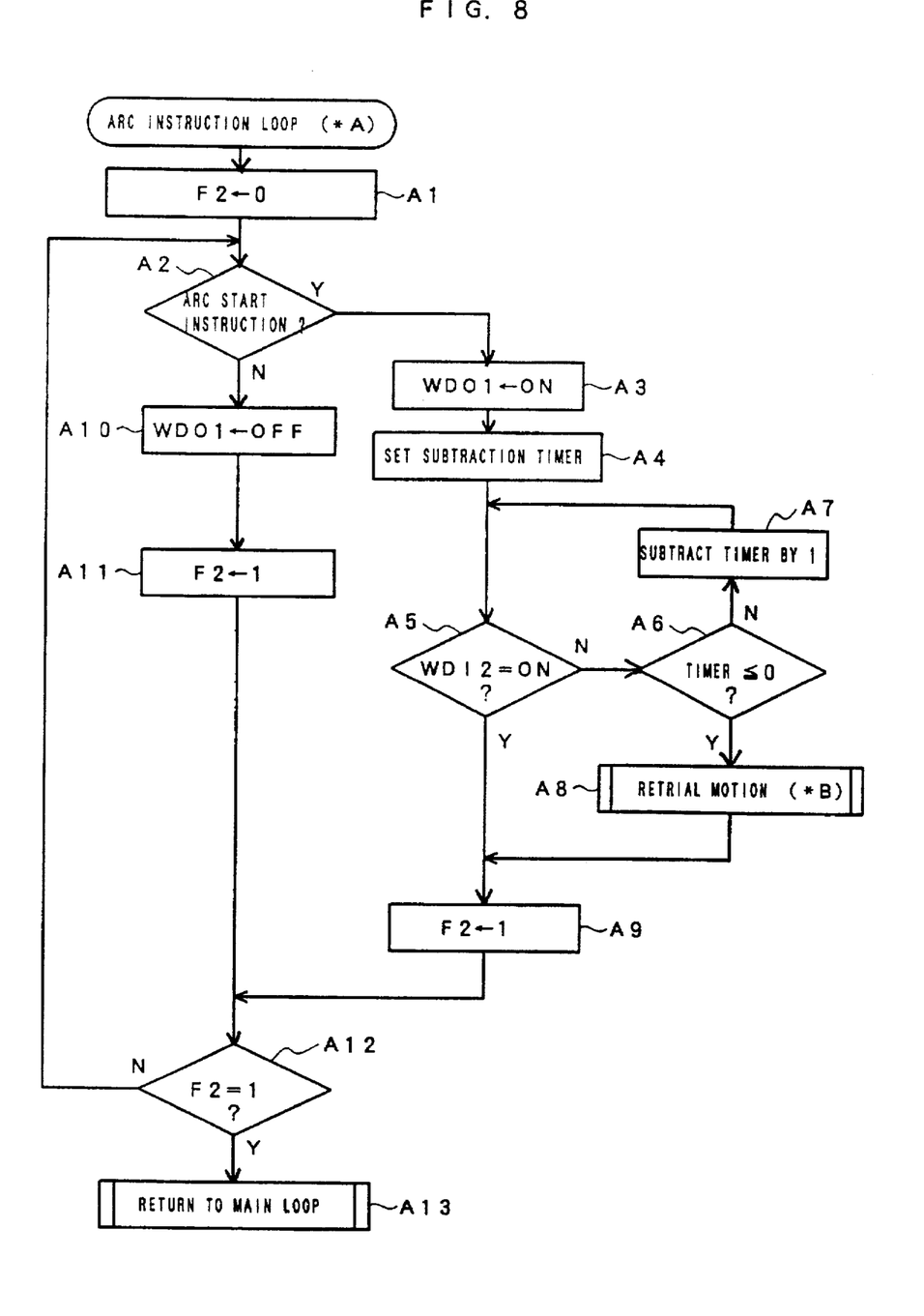
FIG. 8 is a flowchart representing an outline of the processing of an arc instruction loop (*A) in this embodiment.
Figure 9:
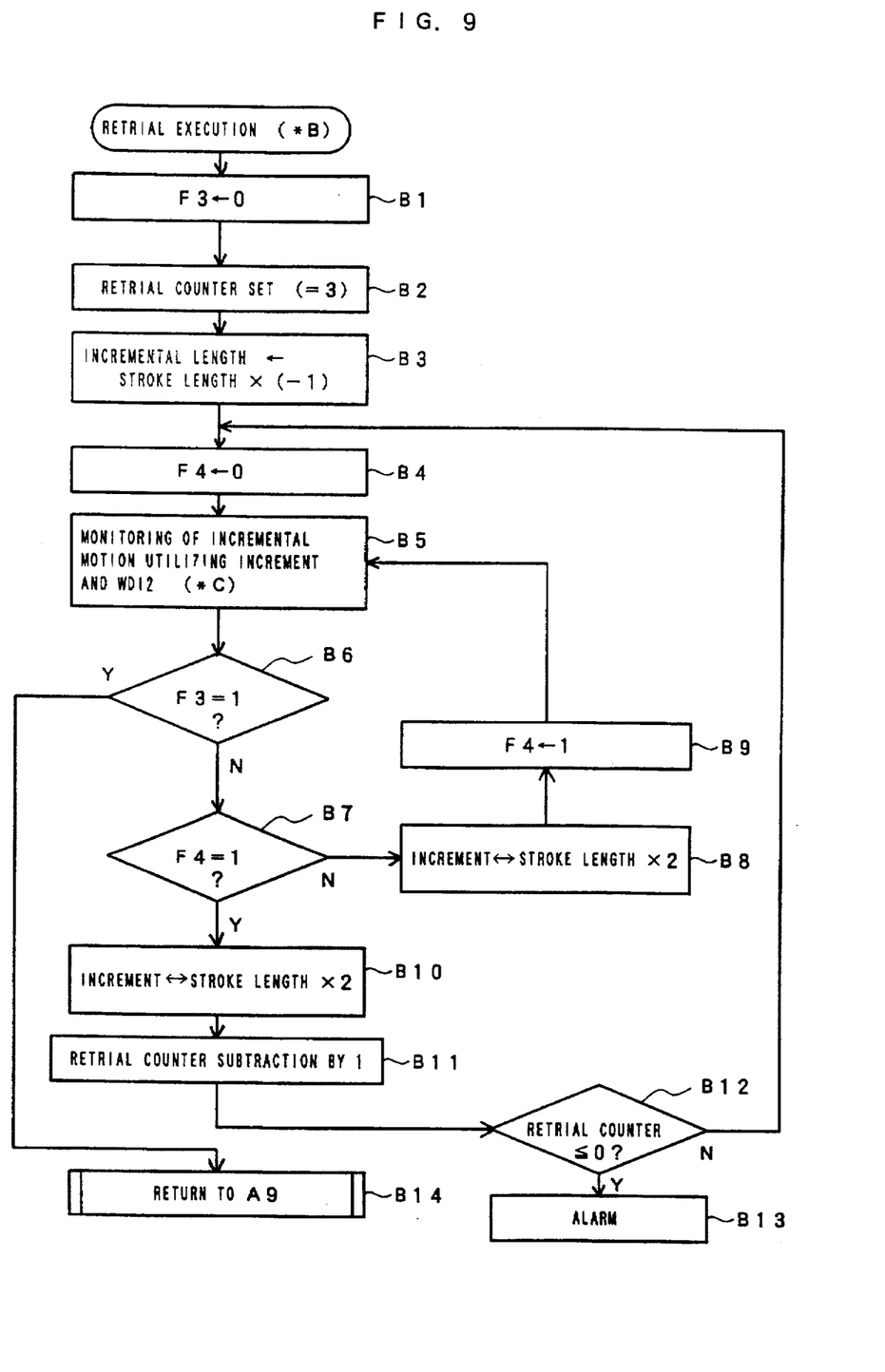
FIG. 9 is a flowchart representing an outline of the processing of a retrial execution loop (*B) in this embodiment.

The outline of processing contents for operating the system in the above-mentioned five modes is shown in the flowchart of FIGS. 7 through 10. FIG. 7 represents the outline of processing of a main loop; FIG. 8, that of an arc instruction loop; FIG. 9, that of a retrial execution loop; and FIG. 10, that of each processing of an arc detection input validation loop during trial motion.

First, the processing of the main loop (FIG. 7) is started in a state in which the initial value F1 of a line completion flag F1 equals 1 (one), and the line completion flag F1=1 is validated in step M1. Then, after the line completion flag F1 is inverted to 0 (zero) (step M2), one line of the motion program (see FIG. 4) is read (step M3). The category of an instruction sentence on the read line is discriminated in steps M4 through M6.

Since the first line is an instruction for the movement to the position [1], the processing proceeds from step M4 to step M7, causing the robot to move to the position [1]. When the movement is completed, and after the line completion flag F1 is inverted from 0 to 1 (step M9), the processing returns to step M1. Then, the process proceeds again through step M1 and step M2 to step M3, in which the next one line (the second line) of the motion program is read. Since the second line is an instruction for the movement to the position [2], the process proceeds from step M4 to step M7, causing the robot to move to the position [2] (Q0 in FIG. 6). Thereafter, as with the previous cycle, the process proceeds through step M9, step M1 and step M2 to step M3, in which the next one line (the third line) of the motion program is read.

Since the arc instruction has been read this time, the process proceeds from step M5 to step M8, in which the processing (*A) of the arc instruction loop shown in FIG. 8 is executed. In the processing of the arc instruction loop, first, an arc instruction completion flag F2 is initially set to F2=0 (step A1). Then, whether or not the arc instruction is a start instruction is judged (step A2). Now, since the arc start instruction on the third line of the motion program has been read, the process proceeds sequentially from step A2 to step A3 and step A4, in which an arc generation signal WDO1 is, standing for Weld Digital Output signal No.1, made to an ON state, and at the same time, a positive value corresponding to a proper wait time previously is in a subtraction timer.

When the arc generation signal WDO1 is made to the ON state, a voltage to generate an arc between the welding torch 2 and the workpiece W is supplied from the welding power source 20. Step A5 following step A4 is a step in which an arc generation is validated. That is, in step A5, an ON/OFF state of an arc detection input signal WDI2 which becomes an ON state when the arc detection signal is outputted to the robot controller 10, is validated.

Since the arc detection input signal WDI2, standing for Weld Digital Input signal No.2, is in an OFF state until an arc is generated, the process proceeds from step A5 to step A6. In step A6, the remainder of the wait time set in step A4 is validated by a value of the timer set in step A4. Since in step A6 of the first cycle, the timer value is as it is set initially, the process proceeds from step A6 to step A7. After subtracting 1 from the timer value in step A7, the process returns to step A5, in which an ON/OFF state of the arc detection input signal WDI2 is checked again.

Thereafter, step A5 through step A7 are repeated in a short cycle until the ON state of the arc detection input signal WDI2 is validated in step A5, or until the conditions that the timer value is 0 or less is validated in step A6.

Both the former case (where the retrial motion is not executed) and the latter case (where the retrial motion is executed) will be explained hereinafter.

The following is a case where an arc is generated within a scheduled wait time.

In this case, the judgement of YES is made in the following step A5, and the process proceeds to step A9, in which the arc instruction completion flag F2 is inverted to F2=1. Then, after F2=1 is validated in step A12, the process returns to step M9 of the main loop (step A13).

After the line completion flag F1 is inverted from 0 to 1 in step M9 of the main loop, the process returns to step M1. Then, the process proceeds again through step M1 and step M2 to step M3, in which the next one line (the fourth line) of the motion program is read.

Since the fourth line is an instruction for the movement to the position [3], the process proceeds from step M4 to step M7, in which the robot is allowed to move from the position [2] toward the position [3] (a taught point corresponding to the welding end point P2). In the course of this movement, the welding for the span from the point P1 to the point P2 is performed by the welding torch 2 with which an arc is being generated.

Then, the process proceeds through step M9, step M1 and step M2 to step M3, in which the next one line (the fifth line) of the motion program is read.

Since the fifth line is an arc instruction, the process proceeds from step M5 to step M8, from which the process proceeds again to the processing (*A) of the arc instruction loop shown in FIG. 8. First, the arc instruction completion flag F2 is initially set to F2=0 (step A1), and then whether or not the arc instruction is an arc start instruction is judged (step A2). Since the arc end instruction has been read this time, the process proceeds sequentially from step A2 to step A10 and step A11, in which the arc generation signal WDO1 is made to an OFF state, and at the same time, the arc instruction completion flag F2 is inverted to F2=1.

Then, after the arc instruction completion flag F2=1 is validated in step A12, the process returns to step M9 of the main loop.

After the line completion flag F1 is inverted from 0 to 1 in step M9 of the main loop, the process returns to step M1. Then, the process proceeds again through step M1 and step M2 to step M3, in which the next one line (the sixth line) of the motion program is read.

Since the sixth line is an instruction for the movement to the position [4], the process proceeds from step M4 to step M7, in which case the robot is allowed to move from the position [3] toward the position [4]. When the movement is completed, the process proceeds through step M9, step M1 and step M2 and again to step M3, in which "end" as the final instruction of the motion program is read. Accordingly, the process proceeds from step M4 through step M5 and step M6 to end the processing.

As described above, where an arc is generated within a scheduled wait time, the retrial motion is not performed, and the welding work for the span from the point P1 to the point P2 is performed as usual by the regenerating operation.

The following is a case where an arc is not generated within a scheduled wait time.

In this case, the ON state of the arc detection input signal WDI2 is not validated in step A5, then the value of the timer is judged to be 0 or less in step A6, and the process proceeds from step A6 to step A8, in which the processing of the retrial execution loop (*B) is started. The position of the robot (the position of the tool head) at this point is of course the position [2] (Q0 in FIG. 6).

In the processing of the retrial execution loop (see FIG. 9), first, a retrial completion flag F3 is initially set to F=0 (step B1), and then, the retrial counter value is set to a value representing the number of cycles (three cycles here) specified on the retrial condition setting screen of FIG. 5 (step B2).

In the subsequent step B3, the incremental value representing the travel during the reciprocating motion of the robot is set to a value representing the stroke length (2 mm here) specified on the retrial condition setting screen of FIG. 5 multiplied by (−1). Then, a return travel completion flag F4 representing the return travel of the robot during its reciprocating motion is set to F=0. In this state, the incremental motion (motion of approaching to/separating from the workpiece W) based on the incremental value is executed while monitoring the ON/OFF state of the arc detection input signal WDI2. The outline of a processing loop (*C) for this execution is described in FIG. 10.

Figure 10:
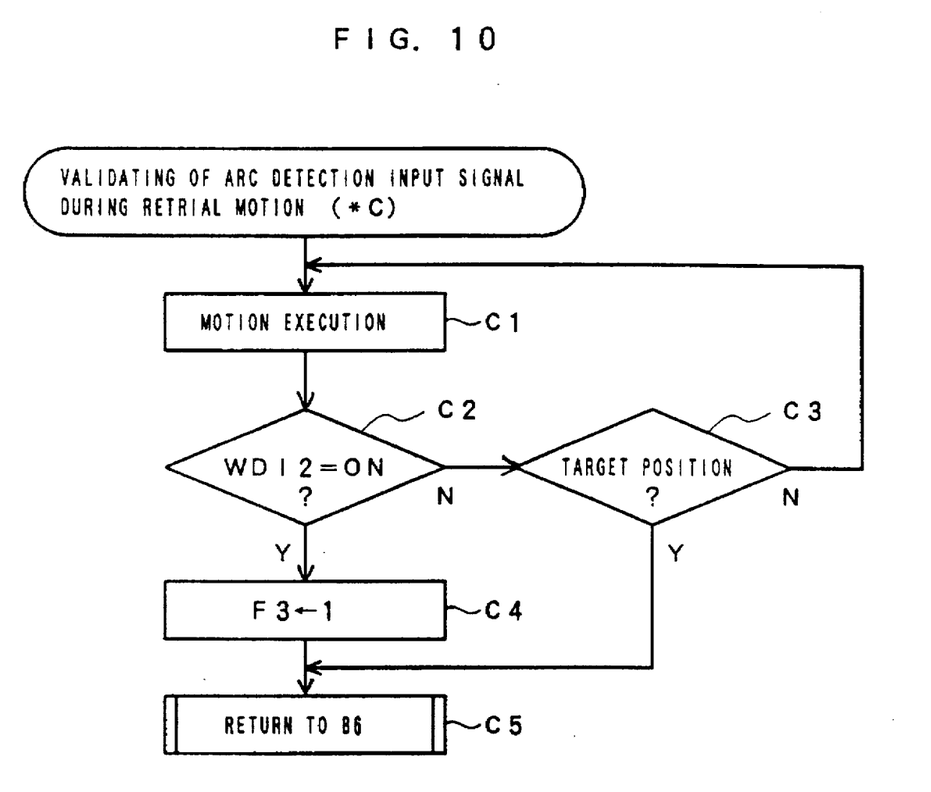
FIG. 10 is a flowchart representing an outline of the processing of a loop (*C) validating an arc detecting input signal during retrial motion in this embodiment.

In step C1, the robot movement through a distance in the Z-axis direction specified by the incremental value is started. Since, in the stage in which the robot starts from the retrial motion start point Q0, the increment of −2 mm has been set in step B3, the robot starts to move from the position Q0 toward the proximity point Q− along the −Z-axis direction. The processing for the robot movement (step C1) and the processing for monitoring the arc detection input signal (step C2 and on) are repeated in a short cycle.

That is, following the step C1, step C2 is executed, in which the ON/OFF state of the arc detection input signal WDI2 is validated.

Both the case where an arc has been successfully started within the set limit number of retrial cycles (three cycles here) and the case where an arc has failed to start will be explained separately hereinafter. For convenience, first the latter case, where an arc has failed to start within the set limit number of retrial cycles (three cycles), will be explained.

In this case, while the robot continues the retrial motion (motion of approaching to/separating from the workpiece W) by repeating step C1, the arc detection input signal WDI2 is left off. Accordingly, the result of judgement in step C2 is "NO" for each time. Since, at this point, the direction of movement of the robot at the start of retrial motion is the −Z-axis direction, the robot moves aiming at the proximity point Q−.

When the robot reaches the proximity point Q−, the judgement of YES is made for the first time in step C3, and the process returns to step B6 of the loop of *B (step C5).

Since at this point, the retrial completion flag F3 is left as F=0, and the return completion flag F4 is also left as F=0, the process proceeds from step B6 to step B7 and step B8. In step B8, a value (4 mm here), two times the stroke length set as the increment, is set. Further, after the value of the return completion flag is inverted to 1, the process proceeds to step B5, and returns to the loop of *C.

Although the processing of the loop of *C is similar to that of the previous cycle, since the increment has been set to the value (4 mm here) two times the stroke length this time, the robot moves from the proximity point Q− toward the remote point Q+. When the start of arc is not detected in this process, the processing cycle in the order of step C1→step C2→step C3→step C1 . . . is repeated, and thus the robot finally reaches the remote point Q+.

Although the process proceeds to step C5, and returns to step B6 of the loop of *B, this time the retrial completion flag F3 is at F=0, and the return completion flag F4 is at F=1. Accordingly, the judgement in step B7 following step B6 is YES, and thus the process proceeds to step B10. In step B10, a value (−4 mm here) obtained by inverting the sign of the value two times the stroke length, which has been set as the increment, is set. Further, after the value of the retrial counter is subtracted by 1 (step B11), whether or not the value of the retrial counter is 0 or less is checked.

Since the initial set value of the retrial counter is 3, the value of the retrial counter is 2 at this point, and thus the judgement in step B12 is NO. Thus, the process again returns to step B4, in which the return completion flag F4 is inverted to F=0, and then the process proceeds to step B5, and returns to the loop of *C.

Although the processing of the loop of *C is similar to the previous cycle or the cycle before the preceding one, since the increment has been set to the value (−4 mm here) two times the stroke length multiplied by (−1) this time, the robot moves from the remote point Q+ toward the proximity point Q−. When, in this process, the start of are is not detected, the processing cycle of step C1→step C2→step C3→step C1 . . . is repeated, the robot finally reaches the proximity point Q−, and the process proceeds to step C5 and again returns to step B6 of the loop of *B.

Thereafter, as long as the arc start detection input is not made, the loops of *C and *B are repeated as before. In this process, each time the robot goes through step B11 of the loop of *B once, the retrial counter value is reduced by 1. The robot starts the reciprocating motion from the retrial start point Q0, and at the point when the robot has followed the route of Q0→Q−→Q+→Q−→Q+→Q−→Q+, the process proceeds from step C3 to step C5 and returns to the loop of *B, where the continuation of the retrial motion is stopped. That is, the process proceeds through step B6, step B7 and step B10 to step B11, in which the retrial counter value is updated from 1 to 0. Then, in the following step B12, the judgement of YES is made for the first time, and the process proceeds to step B13, in which an alarm signal is generated. Also, after required processings such as the turn-off of the welding power and application of the brakes to the robot are performed, the motion and processing of the system are stopped.

The following is a case where an arc has been started within the set limit number of retrial cycles (three cycles).

When an arc is generated after the robot starts the retrial motion, or before the robot goes through the limited number of the retrial motion cycles, the arc detection input signal WDI2 immediately becomes an ON state. Accordingly, the immediately following result of judgement in step C2 becomes YES.

Then, the processing in step C4 is executed for the first time, in which the retrial completion flag F3 is inverted to F=1. In this state, when, the processing returns to step B6 of the loop of *B from step C5, the judgement in step B6 naturally becomes YES. Thus, the process proceeds from step B6 to step B14, and returns to step A9 of the loop of *A.

In step A9, the arc instruction completion flag F2 is inverted to F=1, then F2=1 is validated in step A12, and then the process returns to step M9 of the main loop (step A13).

In step M9 of the main loop, the line completion flag F1 is inverted from 0 to 1, and the process returns to step M1. Then, the process proceeds again through step M1 and step M2 to step M3, in which the next one line (the fourth line) of the motion program is read.

Since the fourth line is an instruction for the movement to the position [3], the process proceeds from step M4 to step M7, where processing is started for causing the robot to move from the position at which an arc is generated toward the position [3]. However, since there is some time lag due to the factors such as arc detection delay, CPU processing cycle, and the like, there is some possibility that the retrial motion will continue even after an arc is generated.

The following motion is substantially the same as that in the case where an arc is generated within a scheduled wait time which has been previously described. That is, in the process in which the robot moves from the arc generating point toward the position [3], the welding for the span from P1 to P2 is performed by the welding torch 2 with which an arc is generated.

Then, the process proceeds again through step M9 (in which the line completion flag F1 is inverted for F1=1, step M1 (in which the value of F1 is checked) and step (in which F1 is inverted for F1=0) to step M3, in which the next one line (the fifth line) of the motion program is read.

Since the fifth line is an arc instruction, the process proceeds from step M5 to step M8, from which the process proceeds again to the processing (*A) of the arc instruction loop. After the arc instruction completion flag F2 is initially set for F=0 (step A1), whether or not the arc instruction is an arc start instruction is judged (step A2). Since the arc end instruction has been read this time, the process proceeds sequentially from step A2 to step A10 and step A11, in which the arc generation signal WDO1 is made to an OFF state, and at the same time, the arc instruction completion flag F2 is inverted to F2=1.

Then, after the arc instruction completion flag F2=1 is validated in step A12, the process returns to step M9 of the main loop.

After the line completion flag F1 is inverted from 0 to 1 in step M9 of the main loop, the process returns to step M1. Then, the process proceeds again through step M1 and step M2 to step M3, in which the next one line (the sixth line) of the motion program is read.

Since the sixth line is an instruction for movement to the position [4], the process proceeds from step M4 to step M7, in which the robot is allowed to move from the position [3] toward the position [4]. When the movement is completed, the process proceeds through step M9, step M1, step M2 and again to step M3, in which "end" as the final instruction of the motion program is read. Accordingly, the process proceeds from step M4 through step M5 and step M6 to the end to complete the processing.

As described above, even when an arc is generated during the retrial motion, as equally as a case where an arc is generated within a scheduled wait time, the welding work for the span from P1 to P2 is performed by the regenerating operation.

Also, as a variation of the above-mentioned embodiments, a route in which the robot is made to return once to the position [2] or another proper position and then is made to move toward the position [3] instead of being made to directly enter the route in which the robot moves from a position at which the arc detection signal is received to the position [3] may be considered as a moving route after the retrial motion is stopped. Also, other various variations are possible for the reciprocation route during the retrial motion. For example, by choosing the retrial motion start position Q0 as a remote point, a method of setting the reciprocating motion between the remote point and the proximity point Q− may be employed. The route in this case extends in the order of Q0→Q−→Q0→Q−→ . . .

As described above, a position at which the head 4 of the arm 3 is closest to the workpiece W is the proximity point Q− which is a little away from the workpiece W. However, alternatively, for each the retrial motion, or during one retrial motion of several ones, the head 4 of the arm 3 may be made to beat the workpiece W to remove the causes of the arc generation failure, such as a relatively soft slug and the like.

What is claimed is:

1. A method for inducing arc generation in arc welding between a head of a wire supported by a welding torch mounted on a robot and a workpiece, comprising the steps of:

attempting to generate an arc between the head of the wire and the workpiece to start the arc welding;

detecting whether a failure of the arc generation occurs; and if the failure of the arc generation occurs, repeating a motion of the head of the wire toward the workpiece and a motion departing from the workpiece by moving the robot, to facilitate the generation of the arc between the head of the wire and the workpiece.

2. A method for inducing arc generation in arc welding between a head of a wire supported by a welding torch mounted on a robot and a workpiece, comprising the steps of:

(a) detecting that, when the robot is made to move to bring the head of a wire near a welding start position on the workpiece, an arc is generated between the head of the wire at the position and the workpiece within a predetermined time;

(b) starting a predetermined welding for the workpiece if an arc generation signal is detected within the predetermined time of said step (a);

(c) if the arc generation signal is not detected within the predetermined time, performing at least one cycle of sequential motion of the robot, each cycle including first moving the robot to cause the head of the wire to be moved at a predetermined speed from a position close to the current welding start position to another position away from the position by a predetermined distance and then moving the robot in the opposite direction to cause the head of the wire to be moved at a predetermined speed toward the welding start position; and (d) performing predetermined arc welding for the workpiece when the arc generation signal is detected during the at least one cycle of sequential motion of said step (c), by stopping said sequential motion of the robot and by moving the robot so that the head of the wire approaches the welding start position.

3. A method for inducing arc generation in arc welding as set forth in claim 2, further comprising previously limiting the number of cycles to be repeated as the sequential motion by the robot in said step (c); and if the arc generation signal is not detected even if the limited number of cycles is repeated, producing an alarm, and then stopping the sequential motion by the robot.

4. A method for inducing arc generation in arc welding as set forth in claim 2, wherein the sequential motion by the robot in said step (c) includes at least one cycle of a motion in which the head of the wire is made to strike the workpiece.

5. A method for inducing arc generation in arc welding between a head of wire supported by a welding torch and a workpiece, comprising the steps of:

(a) moving the welding torch so that the head of the wire is moved to a welding start position and attempting to generate an arc;

(b) determining whether the arc is generated is step (a);

(c) starting a predetermined welding if the arc is generated in step (b);

(d) moving the welding torch so that the head of the wire is moved in a first direction one of towards and away from the workpiece up to a first predetermined point and checking whether the arc has been generated, if the arc is not generated in said step (a); and (e) performing the predetermined welding if the arc is generated in said step (d).

6. A method of inducing arc generation in arc welding as set forth in claim 5, wherein said step (c) further comprises moving the welding torch so that the head of the wire is moved in a second direction opposite to the first direction up to a second predetermined point after the head of the wire has reached the first predetermined point, if the arc is not generated by the time the head of the wire reaches the first predetermined point.

7. A method of inducing arc generation in arc welding as set forth in claim 6, wherein said step (c) further comprises:

moving the welding torch so that the head of the wire is repeatedly moved to the first and second predetermined points a predetermined number of times if the arc is not generated; and stopping the movement of the welding torch after the head of the wire has reached the first and second predetermined points a set number of times and the arc is not generated.

8. A method of inducing arc generation in arc welding as set forth in claim 7, wherein the first predetermined direction is towards the workpiece and the second predetermined direction is away from the workpiece, and said first predetermined point is closer to the workpiece than the welding start position and the second predetermined point is further from the workpiece than the welding start position.

9. A method of inducing arc generation in arc welding as set forth in claim 7, wherein the first predetermined direction is towards the workpiece and the second predetermined direction is away from the workpiece, and said first predetermined point is closer to the workpiece than the welding start position and the second predetermined point is the welding start position.

* * * * *

UNITED STATES PATENT AND TRADEMARK OFFICE
CERTIFICATE OF CORRECTION

PATENT NO. : 5,630,955
DATED : May 20, 1997
INVENTOR(S) : Tetsuya KOSAKA, et al.

It is certified that error appears in the above-indentified patent and that said Letters Patent is hereby corrected as shown below:

IN THE DRAWINGS: Sheet 4 of 7, insert --FIG. 7-- at top of page

Col. 9, line 51, after "step" insert --M2--.

Signed and Sealed this

Twenty-second Day of July, 1997

Attest:

BRUCE LEHMAN

*Attesting Officer*    *Commissioner of Patents and Trademarks*